July 26, 1938.  D. W. HARTZELL  2,124,700

LARDING NEEDLE

Filed March 9, 1935

WITNESS—
Wm. C. Meiser

Dwight W. Hartzell
INVENTOR
BY
ATTORNEY

Patented July 26, 1938

2,124,700

UNITED STATES PATENT OFFICE 2,124,700

LARDING NEEDLE

Dwight W. Hartzell, Dixon, Ill., assignor to Industrial Patents Corporation, Chicago, Ill., a corporation of Delaware Application March 9, 1935, Serial No. 10,320

3 Claims. (Cl. 17—42.1)

This invention relates to new and useful improvements in larding needles.

Larding needles are commonly used in the art of butchering for inserting strips of bacon, ground beef suet, and the like into lean cuts of meat, to enhance the flavor and palatability thereof. The devices heretofore proposed, however, upon being thrust through the meat, have caused the meat to be jaggedly torn, thereby unnecessarily breaking down the cellular tissues of the meat immediately around the inserted lardoon, which permits a large portion of the natural juices to escape therefrom.

It is, therefore, one of the objects of this invention to provide a larding needle which, when passed through the meat, will cut a clean narrow slit of a size not larger than is necessary to care for the needle.

Another object of this invention is to provide means for facilitating the thrusting of the needle through the meat with a minimum of pressure.

Another object of this invention is to provide simple means for securely holding the several sections of the needle in alignment during the thrusting operation.

In the drawing, like reference characters denote similar parts throughout the several views.

Figure 1:
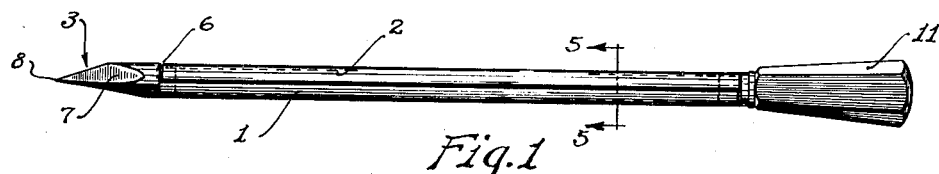
Figure 1 is a plan view of the device forming the present invention.
Figure 2:
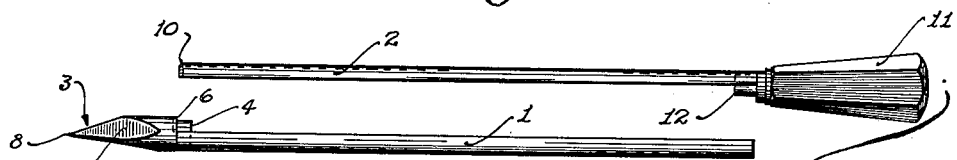
Figure 2 is a view of the device with the several sections shown separated.
Figures 3, 4:
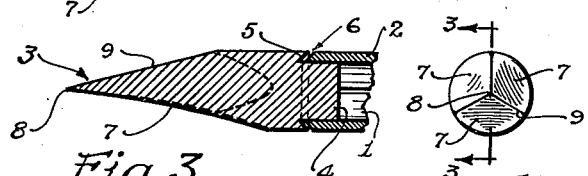
Figure 3 is a sectional view taken on line 3—3 of Figure 4.
Figure 4 is a view of the point end of the device.
Figure 5:
Figure 5 is a sectional view taken on line 5—5 of Figure 1.

The device forming the present invention comprises a cylindrical tube, divided on its longitudinal axis to form semicylindrical sections 1 and 2. Pointed member 3 is provided with a reduced cylindrical shank 4 and is rigidly secured to the forward end of section 1, on shank 4. Shank 4 extends above section 1, and serves to engage the hollow of section 2. Member 3 is rearwardly cut to form shoulder 5 by which is provided angular niche 6 for the reception of one end of section 2.

Member 3 is cut to form a plurality of facets 7, preferably three, which converge toward the free end of member 3 and terminate in a sharp point 8. Facets 7 are gradually filleted from either end to a definite concave at about midway of the fillet. The adjacent facets 7 are defined by common knife-like edges 9. It will be seen that upon thrusting the needle through a cut of meat, the edges 9 will act to cut a clean narrow slit, while the facets 7, between edges 9, will carefully spread the slitted portion sufficient to care for the needle.

The end 10 of section 2 is beveled to fit within angular niche 6. Handle 11 is provided with a reduced cylindrical shank 12 and is rigidly secured to section 2, at shank 12. Shank 12 extends from the edge of section 2 to engage the hollow of section 1 as a means of holding the several sections in alignment when the needle is assembled.

Figure 6:
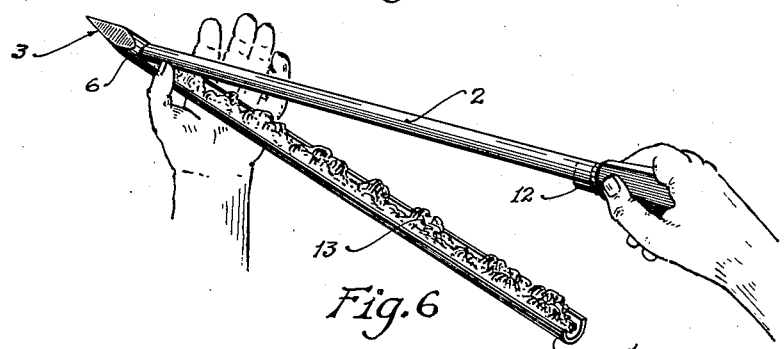
Figure 6 is a perspective view of the device shown containing a charge of lardoon and being assembled ready for insertion.
Figure 7:
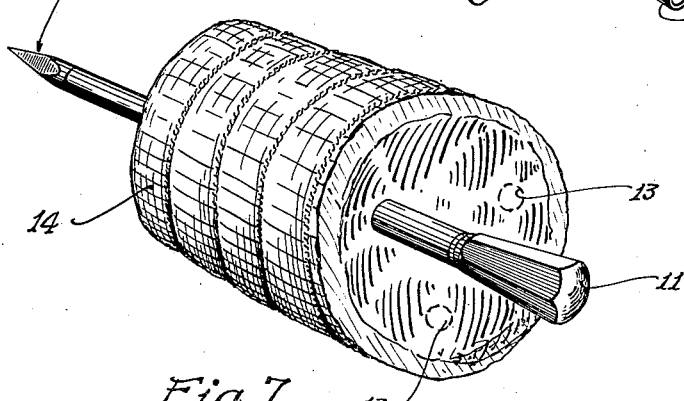
Figure 7 is a perspective view, illustrating the manner in which the device is passed through a cut of meat.

In use of the device herein described, a charge of lardoon 13 is placed within the hollow of section 1, as shown in Figure 6. Section 2 is then placed upon section 1 and securely held in alignment by means of niche 6, and shanks 4 and 12. The needle is then passed through a cut of lean meat 14, such as roast or the like, until the member 3 is extended from the opposite side as shown in Figure 7. The needle is then withdrawn by grasping the pointed member 3 with one hand, and the handle 11 with the other, and simultaneously pulling both sections in opposite directions. This will leave the lardoon extending in an unbroken strip through the meat. As many insertions as may be desired to suit the individual taste may be made in a cut of meat, for example, lardoons 13, shown in Figure 7.

I claim:

1. A device of the class described, comprising two semicylindrical sections forming a tube, a pointed member having filleted facets converging to a point at the free end thereof and provided with a reduced shank secured to the forward end of one of said sections, a shoulder rearwardly extending from said member above said mentioned section providing an angular niche, said facets being filleted between their ends, knife-like edges between said facets, said knife-like edges defining common edges to adjacent facets, a beveled end on the other semicylindrical section engageable with said angular niche, and a handle having a reduced shank secured to the opposite end of said last-mentioned section.

2. A device of the class described, consisting of two semicylindrical sections forming a tube, a pointed member having filleted facets converging to a point at the free end thereof and provided with a reduced shank secured to the forward end of one of said sections at said shank, a shoulder rearwardly extending from said member above said mentioned section providing an angular niche, said facets being gradually filleted between their ends to a definite concave, knife-like edges between said facets, said knife-like edges defining common edges to adjacent facets, a beveled end on the other semicylindrical section engageable with said angular niche, and a handle having a reduced shank secured to the opposite end of said last-mentioned section at said shank, each of said shanks extending from its respective section to engage the hollow of the opposite section.

3. A larding needle comprising two semicylindrical sections forming a tube, a pointed member having a reduced shank secured at the forward end of one of said sections, a shoulder rearwardly extending from said pointed member above said mentioned section providing an angular niche, a beveled end on the other semicylindrical section engageable with said angular niche, and a handle having a reduced shank secured at the opposite end of said last-mentioned section, the shank of each section being adapted for engagement with the other of said sections.

DWIGHT W. HARTZELL.